United States Patent [19]
Anderson et al.

[11] Patent Number: 5,779,908
[45] Date of Patent: Jul. 14, 1998

[54] METHOD AND APPARATUS FOR WASTE WATER TREATMENT

[75] Inventors: Richard Wayne Anderson; Lee Edward Ellenburg, both of Gainseville, Ga.

[73] Assignee: Sorin, Inc., Gainsville, Ga.

[21] Appl. No.: 806,073

[22] Filed: Feb. 25, 1997

Related U.S. Application Data

[62] Division of Ser. No. 504,221, Jul. 19, 1995, abandoned.

[51] Int. Cl.$^6$ .................. C02F 1/24; C02F 1/48; C02F 1/20; C02F 1/72
[52] U.S. Cl. .................. 210/703; 210/695; 210/705; 210/718; 210/721; 210/750; 210/758; 210/206; 210/221.2; 210/223; 210/259
[58] Field of Search .................. 210/695, 703, 210/704, 705, 708, 718, 721, 750, 758, 188, 205, 206, 221.2, 222, 223, 259

[56] References Cited

U.S. PATENT DOCUMENTS 4,412,924  11/1983  Feather .
5,006,240  4/1991  Steffero .

FOREIGN PATENT DOCUMENTS 1315389  6/1987  U.S.S.R. .

Primary Examiner—Thomas M. Lithgow
Attorney, Agent, or Firm—Needle & Rosenberg, P.C.

[57] ABSTRACT

An apparatus and method for removing contaminants from waste water directs the waste water through a first magnetic field. An ionic polymer is introduced into the waste water after the waste water passes through the first magnetic field, whereby at least some contaminants flocculate. Flocculated contaminants are separated from the waste water so as to form a waste water effluent. An oxidizing agent is introduced into the waste water effluent and the waste water and the oxidizing agent are directed through a second magnetic. The waste water is directed through a weir into a trough open to the atmosphere. Air is injected into the trough so that at least one gas within the waste water combines with the air injected into the waste water. The combined air and gas floats to the surface of the waste water and is expelled into the atmosphere. Foam is removed from the waste water in the trough.

1 Claim, 4 Drawing Sheets

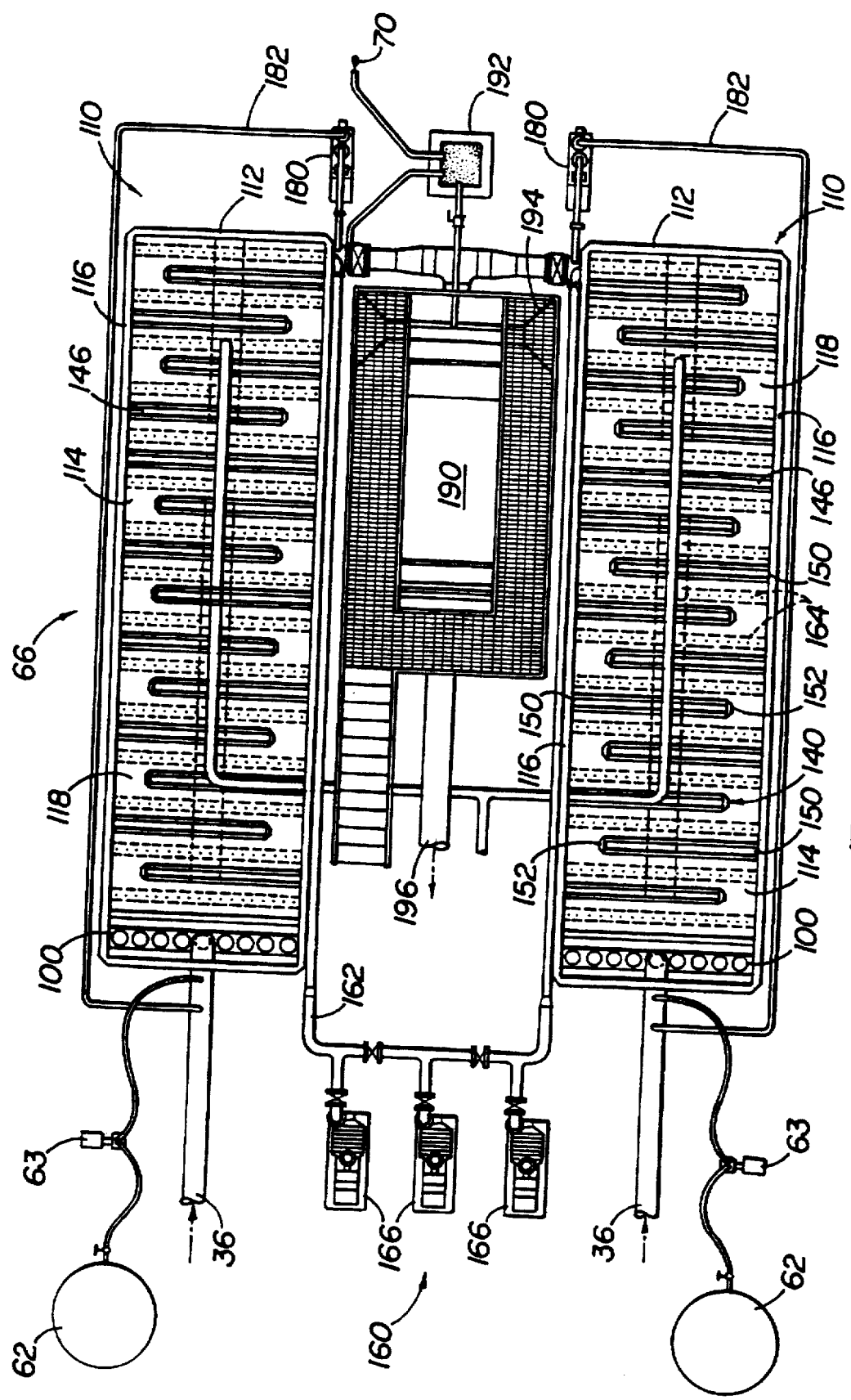

METHOD AND APPARATUS FOR WASTE WATER TREATMENT

This application is a divisional of application Ser. No. 08/504,221, filed Jul. 19, 1995 which status is abandoned.

FIELD OF THE INVENTION

The present invention relates to waste water treatment and, in particular, to removal of solids and dissolved compounds from waste water.

DESCRIPTION OF THE PRIOR ART

Waste water from poultry processing plants and meat packing plants generally has high concentrations of blood, suspended solids and various organic compounds. Suspended solids are often separated from the waste water, thereby forming a sludge, and the waste water effluent is sent to a water treatment plant for further processing. Because of its high protein content, the sludge is often sent to a rendering plant for reprocessing as supplements to animal feeds.

Several methods of treating waste water from poultry processing plants are known in the prior art. These include dissolved air flotation (DAF), which removes suspended solids, oil and grease from waste water by use of dissolved air acting as a buoyant to lift the solids, oil and grease to the surface of the waste water for removal. Such removal eliminates some portion of the organic materials in the waste water and thus reduces biochemical oxygen demand (BOD) and chemical oxygen demand (COD). However, DAF has the disadvantage of being ineffective in floating smaller elements of suspended solids and is completely ineffective in removing soluble organic materials.

Induced flocculation, which comprises adding a flocculating agent to the waste water in the DAF process, causes smaller particles of the suspended solids to form larger clumps. As a result, the buoyancy of the solids is enhanced and a greater number of solids are floated to the surface for removal. The flocculating agents used in the prior art include ferric chloride or sulfuric acid added to a polymer. The combination of ferric chloride and a polymer is the most widely used agent. It is marginally effective in reducing biological oxygen demand (BOD) and is almost completely ineffective in reducing the total Kjeldahl nitrogen (TKN) level in the waste water.

Furthermore, ferric chloride tends to cause retention of water in the sludge which requires extensive heating by the rendering plant to recycle the sludge into animal feed supplements. Also, iron tends to degrade the sludge by darkening it and increasing its acidity.

Several biological treatment processes are used to decontaminate waste water by biologically decomposing organic matter. These types of systems include ammonia nitrogen stripping towers, bio-towers and biological treatment plants. These types of systems have several disadvantages, including: they require substantial capital expenditures, they take up large amounts of space, they involve intensive operator monitoring, they are ineffective where large amounts of oil and grease are present, and they can be adversely affected by weather conditions.

None of the above methods inexpensively produce high quality sludge and waste water effluents low in TKN, BOD and COD.

SUMMARY OF THE INVENTION

One aspect of the present invention is an apparatus for removing contaminants from waste water. It comprises a means for directing the waste water through a first magnetic field, a means, in fluid communication with the directing means, for introducing an ionic polymer into the waste water after the waste water passes through the first magnetic field, whereby at least some contaminants flocculate. A means, downstream of the introducing means, is provided for separating flocculated contaminants from the waste water so as to form a waste water effluent.

Another aspect of the present invention is an apparatus for removing contaminants from waste water that employs a means for adding an oxidizing agent into the waste water. A means, located downstream of the adding means, is provided for directing the waste water and the oxidizing agent through a magnetic field. Also, a means, downstream from the directing means, is provided for treating the waste water to cause offgassing therefrom.

Another aspect of the present invention is a method for removing contaminants from waste water. The steps followed include: directing the waste water through a first magnetic field, introducing an ionic polymer into the waste water that has been directed through the first magnetic field so as to cause at least some of the contaminants to flocculate in the waste water, and separating the flocculated contaminants from the waste water after the ionic polymer has been introduced to the waste water, thereby forming a waste water effluent.

Another aspect of the present invention is a method of removing contaminants from waste water. The steps followed include adding an oxidizing agent into the waste water, passing the waste water and the oxidizing agent through a magnetic field, and injecting into the waste water air bubbles that absorb at least one gas from the waste water and then float to the surface of the waste water and are expelled therefrom.

It is, therefore, an object of the present invention to remove organic contaminants from waste water.

It is a further object of the present invention to remove dissolved nitrogen from waste water. It is a further object of the present invention to improve the quality of effluent sludge from waste water treatment plants.

These and other objects will become apparent from the following description of the preferred embodiment taken in conjunction with the following drawings, although variations and modifications may be effected without departing from the spirit and scope of the novel concepts of the disclosure.

BRIEF DESCRIPTION OF THE FIGURES OF THE DRAWINGS

FIG. 4 is a top plan view of the off gassing unit of the present invention.

DETAILED DESCRIPTION OF THE INVENTION

Figure 1:
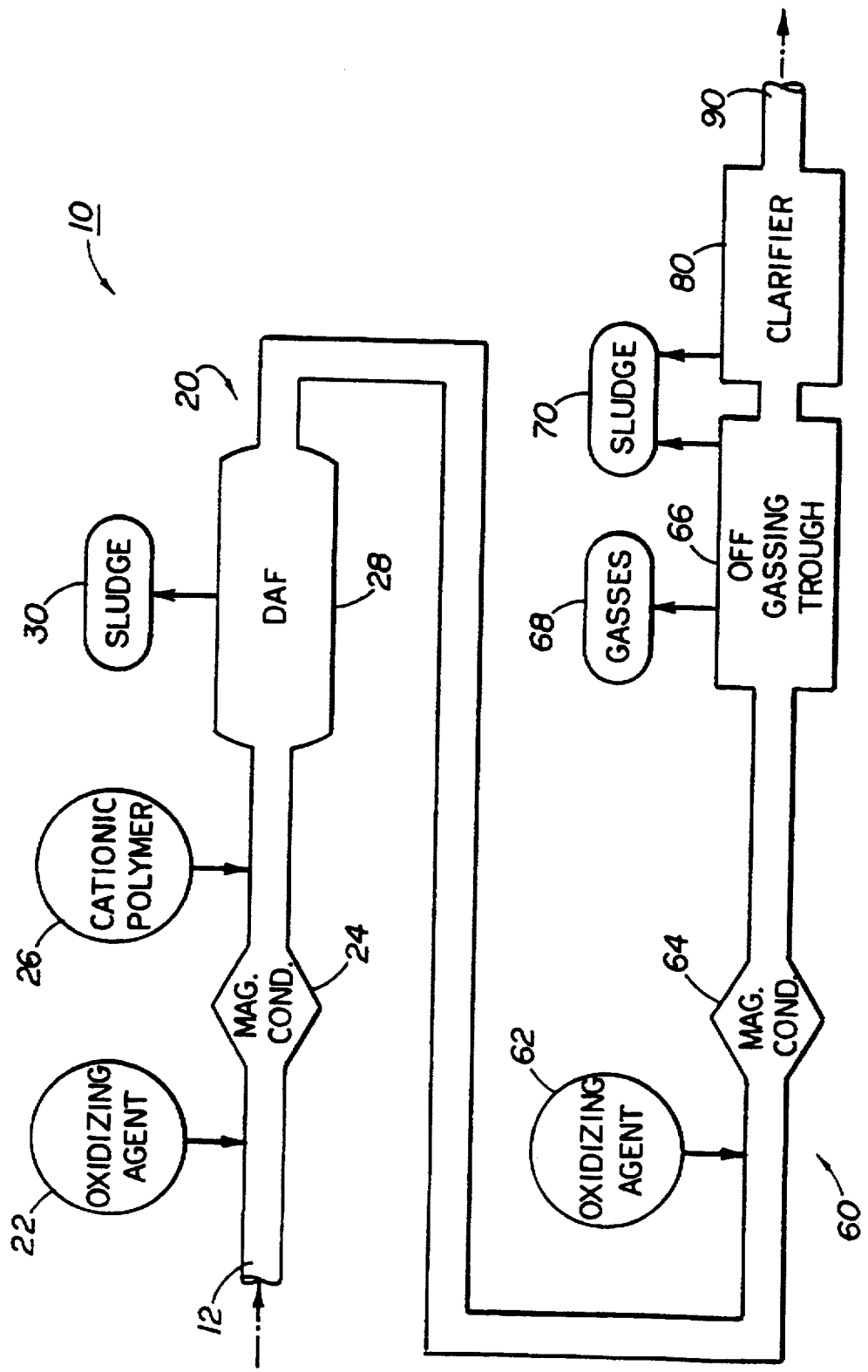
FIG. 1 is a flow diagram showing the process employed in the present invention.

A preferred embodiment of the invention is now described in detail. Referring to the drawings, like numbers indicate like parts throughout the views.

As used in the description herein and throughout the claims that follow, "a," "an," and "the" includes plural reference unless the context clearly dictates otherwise. Also as used in the description herein and throughout the claims that follow, the meaning of "in" includes "in" and "on" unless the context clearly dictates otherwise.

As shown in FIG. 1, the present invention 10 comprises a waste treatment apparatus for treating the effluent of a producer of waste water. The apparatus comprises a flocculation unit 20 and an offgassing unit 60. Although the embodiment herein described is directed to treating waste water from a poultry processing plant, it will be readily understood that any producer of organic-rich waste water (including sewage plants, paper mills and the like) will benefit from the present invention 10.

Initially, in the flocculating unit 20, an oxidizing agent 22, such as calcium hypochlorite, sodium hypochlorite or hydrogen peroxide is preferably injected into the waste water stream near the influent 12 of the flocculating unit 20. This oxidizing agent 22 is preferred when the processing plant is marinating poultry with liquids rich in sodium chloride or soluble BOD. It is believed that the oxidizing agent helps to remove the dissolved salts. The waste water is directed into a first magnetic water conditioner 24 where it passes through a first magnetic field. The magnetic water conditioner 24 employed in the present invention may be of the type disclosed in, for example, U.S. Pat. Nos. 3,951,807, 4,153,559, 4,299,559, and 4,357,237, all issued to Sanderson and incorporated herein by reference. Such magnetic water conditioners are available from Superior Water Conditioners of Fort Wayne, Ind. Furthermore, other methods of generating magnetic fields, such as electro-magnets, will work with the present invention. Furthermore, the use of an electric field may accomplish the same result as a magnetic field. After exiting the magnetic water conditioner 24, an ionic polymer 26 is injected into the waste water stream. Depending on the contaminants being removed, the ionic polymer may be either cationic or anionic of any of the types well known in the art. One preferred cationic polymer is RS 1285 available from R-Square of Gainesville, Ga. The waste water is then directed into a conventional DAF 28 where some of the organic compounds and solids flocculate and eventually are carried off as sludge 30.

The waste water from the flocculating unit 20 is then passed into the offgassing unit 60. Initially, an oxidizing agent 62 such as calcium hypochlorite is injected into the waste water stream. The combination of the waste water and the oxidizing agent 62 is passed through a second magnetic water conditioner 64, of the type described above. From the second magnetic water conditioner 64, the waste water is passed into an off-gassing trough 66 where it gives off gasses 68 and discharges sludge 70. The waste water is then passed into a final clarifier 80 where more sludge 70 is removed and the waste water exits the system as an effluent 90. The waste water is then either recycled or discarded.

Figure 3:
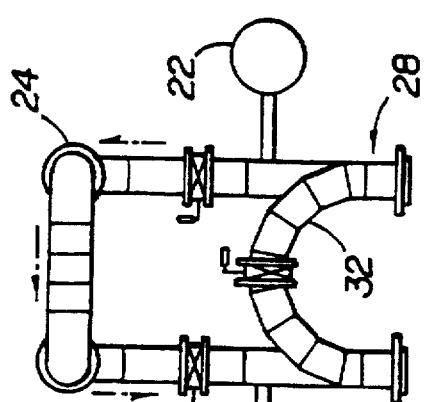
FIG. 3 is a top plan view of the piping connecting the magnetic water conditioner to the DAF unit.
Figure 2:
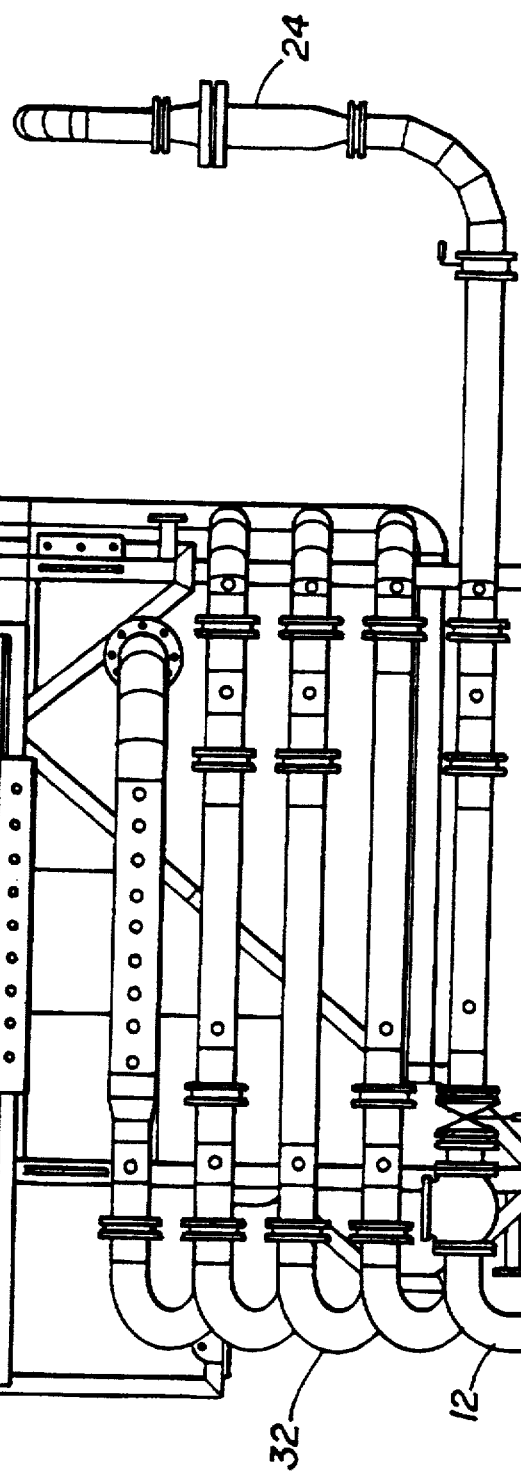
FIG. 2 is a side elevational view of the flocculation unit of the present invention.

As shown in FIG. 2, the flocculating unit 20 comprises a conventional DAF 28 connected to a magnetic water conditioner 24. The influent 12 from the processing plant is received by the DAF 28 and directed through the magnetic water conditioner 24. FIG. 3 is a top plan view of the piping connecting the DAF 28 to the magnetic water conditioner 24. An oxidizing agent 22 is preferably injected into the waste water prior to entering the magnetic water conditioner 24 and an ionic polymer 26 is added to the waste water after it exits the magnetic water conditioner 22. The addition of the oxidizing agent 22 is preferable if the processing plant is performing a marinating process using sodium chloride, or other similar salts, as the purpose of the oxidizing agent 22 in the flocculating unit 20 is to remove salt that would otherwise cause a breakdown of the ionic polymer 26.

Returning to FIG. 2, waste water that has exited the magnetic water conditioner 24 and that has had the ionic polymer 26 injected is directed into a mixing chamber 32 in which contaminants in the waste water will tend to flocculate. The waste water is then directed to a float removal system 30 where the flocculated contaminants are separated from the waste water and removed as sludge, with the remaining waste water forming an effluent.

Figure 5:
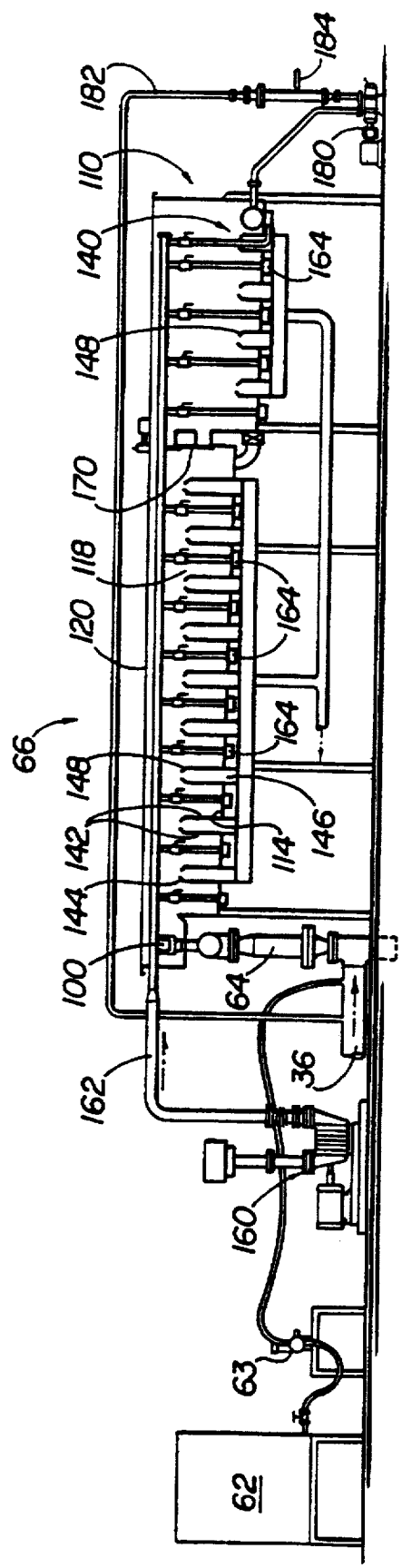
FIG. 5 is a side elevational view of the off gassing unit of the present invention.

As shown in FIGS. 4 and 5, effluent 36 from the flocculating unit 20 is directed into the offgassing unit 66. A second oxidizing agent 62, such as calcium hypochlorite, sodium hypochlorate or hydrogen peroxide is injected into the waste water stream with a metering pump 63. The waste water is directed through a second magnetic field in a second magnetic water conditioner 64. The waste water then flows through a plurality of weirs 100 into a trough 110 that is exposed to the atmosphere. An air injection system 160 then injects air bubbles into the waste water in the trough 110 to aid in removing gasses exiting the waste water in the trough 110. It is believed that the gasses removed comprise nitrogen gasses.

The trough 110 comprises a frame 112 having a bottom 114 with two parallel, vertical, opposed side walls 116 extending upwardly therefrom. The sidewalls 116 have a first side edge 120 and an opposite second side edge 120 and define a cavity 118 therebetween.

The air injection system 160 injects air into the waste water in the trough 110. The air injection system 160 comprises a plurality of blowers 166 that pump air into a header 162, which delivers air to a plurality of air manifolds 164 disposed near the bottom of the trough 110. Air exiting the manifolds 164 forms bubbles in the waste water so at least one gas within the waste water combines with the air injected into the waste water, floats to the surface of the waste water with the injected air and is expelled into the atmosphere.

Typically, the air bubbles injected into the waste water will form a foam at the surface of the waste water that interferes with offgassing. Therefore, a foam removal system 140 is disposed within the trough 110. The foam removal system 140 comprises a plurality of upright, opposed members 144 in the trough, each member 144 being in opposed relationship to another member 144 and comprising a pair of spaced-apart elements 142 upwardly extending from the bottom 114 of the trough 110 and forming a channel 146 therebetween. Each element 142 terminates in a top end 148 which is above the surface of the waste water in the trough so that as foam builds up on the surface of the waste water above the top ends 148, the foam will fall into the channel 146. The elements 142 are laterally disposed within the trough 110 such that the first ends 150 of a first amount of the elements 142 abut the inside surface of one of the side walls 116. The respective second ends 152 of the elements 142 are adjacent to the opposite other sidewall 116 in alternate relationship to the remaining elements 142 that have their second ends 152 abut the inside surface of the opposite side wall 116. Thus, the elements 142 form a circuitous path thereamong for the waste water to flow. Also, a sluice gate 170 is provided to raise the level of the waste water to a level adjacent the top ends 148 of each element 142, thereby increasing the amount of foam that will fall into the channel 146. In alternative embodiments, foam may be removed from the surface of the waste water either by scraping or vacuuming therefrom.

To enhance offgassing, a recirculation line 182 and a recirculating pump 180 may be added to recirculate waste water, rich in dissolved air, from the trough 110 back into the effluent 36 from the flocculating unit 20. The waste water recirculated from the recirculating pump 180 may also be directed through a third magnetic field in a third magnetic water conditioner 184 to further enhance offgassing.

Waste water exiting the trough 110 is then passed into a final clarifier 190, which comprises a conventional drag conveyor 194. The final clarifier 190 removes remaining solids or foam in the waste water and deposits them in a scum pit 192 that allows the solids and foam to settle, discharging them to a sludge discharge 70. The waste water is then directed to a discharge 196 where it is recycled by the processing plant or otherwise discarded.

It is to be understood by those skilled in the art that, depending upon the application, either of the flocculating unit 22 or the offgassing unit 60 could be used by itself or that the order of their employment could be reversed from that described above without departing from the scope of the invention.

EXAMPLE

The following is a comparison of a composite sampling result taken over a 24-hour period from the same waste stream. This sample was treated by a producer of waste water by the old method (a physical/chemical unit using ferric chloride and a treatment polymer) and by the method employed in the present invention. The surcharge limit for a parameter is the contaminant level above which local waste treatment facilities charge an additional fee for receiving waste water. The violation limit is the level above which local waste water treatment facilities may refuse to accept waste water.

The net cost of treating waste water with the present invention is less than the net cost of older methods of treatment. The concept of net cost includes a reduced treatment costs and higher selling prices for the sludge by-product created with this method of waste water treatment. A higher selling price for sludge generated by this method of treatment is attributable to: 1.) a better quality sludge due to the absence of iron or acids; and 2.) a dryer sludge attributable to the absence of the water retaining characteristics of iron. A dryer sludge is more valuable as a raw material or supplement for animal foods because of the lower energy cost required to cook the product. Added advantages of the present invention include: 1.) due to better effluent quality, the waste stream may be recycled or reused; 2.) it results in lowered or avoided surcharges from regulatory agencies for lack of compliance with conventional pollutant standards; and 3.) users may realize cost savings on oxidizing agents used as an alternative to the ferric chloride employed in the prior art.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A method of removing contaminants from waste water, comprising the steps of:

a. adding an oxidizing agent into the waste water;
   b. passing the waste water and the oxidizing agent through a magnetic field;
   c. injecting into the waste water air bubbles that absorb at least one gas from the waste water and then float to the surface of the waste water and are expelled therefrom; and

| Parameter | Surcharge Limit | Violation Limit | Sampling Result Employing the Old Method | Sampling Result Employing the Present Invention |
|---|---|---|---|---|
| B.O.D. 5 | 250 mg/l | 501 mg/l | 240 mg/l | 150 mg/l |
| T.S. Solids | 250 mg/l | 501 mg/l | 35 mg/l | 27 mg/l |
| Oil and Grease | 100 mg/l | 126 mg/l | 5 mg/l | BDL |
| Phosphorus | 10 mg/l | 16 mg./ | 6.7 mg/l | 7.6 mg/l |
| TKN | 40 mg/l | 76 mg/l | 65.4 mg/l | 16 mg/l |
| pH | 6.09–9.5 units | 6.09–9.5 units | 6.2 units | 7.0 units |

BDL = Below detection limit

BOD5 is a measure of the biological oxygen demand and T.S.Solids is a measure of the total suspended solids.

d. removing foam from the waste water.

* * * * *